June 8, 1965 R. L. SKINNER, SR 3,188,098
FLEXIBLE SEAL
Original Filed Dec. 20, 1956 2 Sheets-Sheet 1
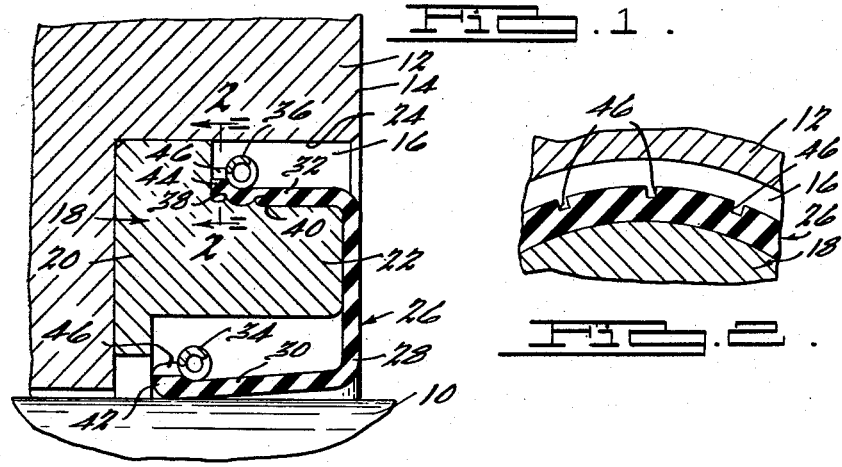
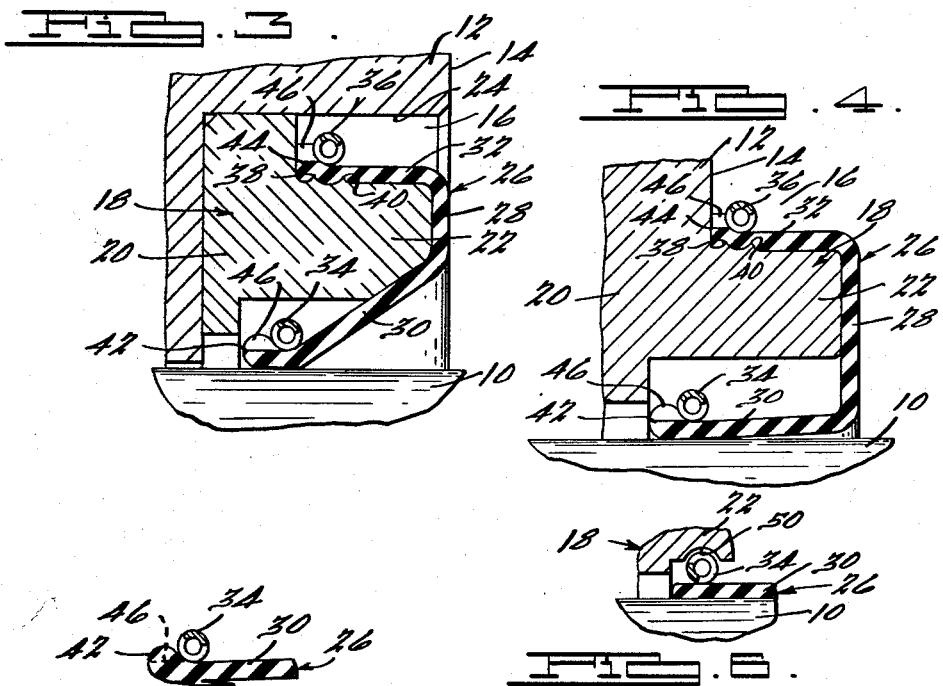
INVENTOR.
Ralph L. Skinner.
BY
Harness, Dickey & Pierce
ATTORNEYS.

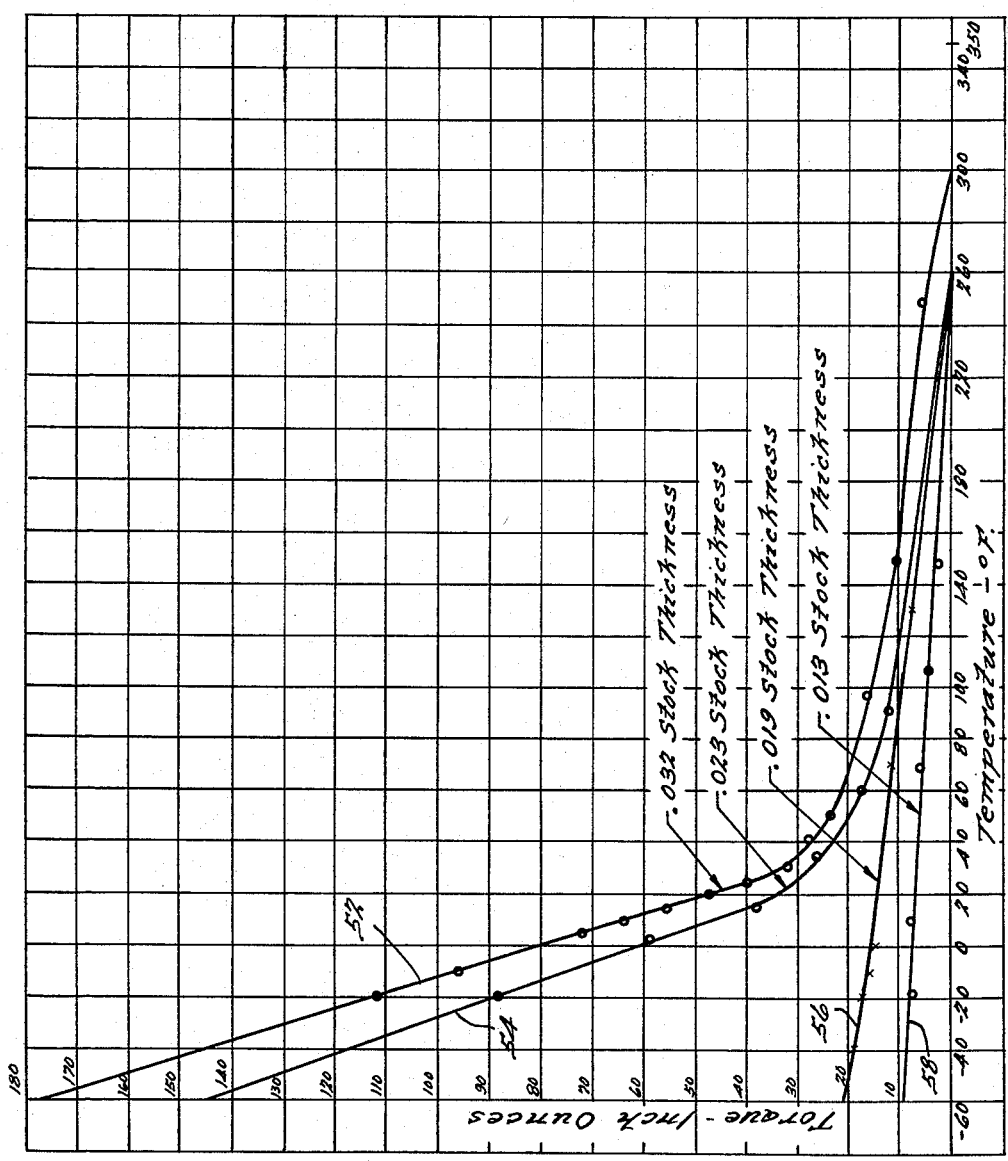

United States Patent Office 3,188,098
Patented June 8, 1965

3,188,098
FLEXIBLE SEAL
Ralph L. Skinner, Sr., Birmingham, Mich., assignor of one-half to Robert T. Skinner
Continuation of applications Ser. No. 629,680, Dec. 20, 1956, and Ser. No. 825,767, July 8, 1959. This application Dec. 10, 1962, Ser. No. 245,633
5 Claims. (Cl. 277—153)

This application is a continuation of my copending application Serial No. 825,767, which was filed July 8, 1959, now abandoned, and of its predecessor application Serial No. 629,680, filed December 20, 1956, now abandoned.

This invention relates to new and useful improvements in seals.

There is a need for a seal that can be adapted for a wide variety of uses under both static and dynamic conditions, that is relatively inexpensive to manufacture and that can be easily and quickly installed. It is the primary object of this invention to provide such a seal.

An ordinary fluid pump and the transmission and crankshaft bearings of an automobile are typical environments for the seal of this invention. Both mechanisms have either rotating or reciprocating shafts and they contain fluid under pressure. In each instance, the shaft is mounted in a housing and it is necessary to seal the shaft where it extends from the housing.

In accordance with the present invention, an annular support is provided around and spaced from the shaft, and a sealing member is mounted on the support and around the shaft. The sealing member is made of a suitable fluorocarbon resin such as the product manufactured and sold by the E. I. du Pont de Nemours & Co., Inc. under the trade name Teflon or the product manufactured and sold by Minnesota Mining & Mfg. Co. under the trade name Kel-F or a resin of this type modified by the addition of material such as graphite or the like, and it is essentially thin to provide flexibility in use required to assure an efficient seal and longevity for the sealing member. The sealing member is annular in form and has laterally spaced inner and outer sealing flanges extending in the same direction from an intermediate or bight portion. The outer sealing flange surrounds and seats on the support and the inner sealing flange surrounds and engages the shaft to be sealed. Garter springs are provided around both flanges. A garter spring on the outer flange holds the latter in pressed fluid-tight engagement with the support, and the garter spring on the inner flange holds the latter in pressed engagement with the shaft. Suitable means are provided for holding the springs on their respective flanges. It is important in this connection to hold the inner spring in a fixed predetermined position on the inner flange so that it exerts a constant uniform constrictive pressure at a point adjacent to the free edge of the flange.

When these conditions obtain and particularly when the sealing member is kept essentially thin as specified, relatively light garter springs can be used to hold the inner and outer flanges or lips of the sealing member in constant engagement with the parts engaged thereby under all normal conditions in use. One of the most difficult environmental conditions to control or compensate is lateral motion or whip of the shaft being sealed and this is a condition commonly encountered. When a shaft is operating at high speed the lateral motion occurs at an equally high frequency and difficulty frequently is encountered in holding the sealing member constantly in engagement with the shaft without excessive friction. This problem is particularly acute where the sealing member is made of a fluorocarbon resin as these resins are relatively inert or non-elastic, have a tendency to cold flow under pressure and have a relatively high coefficient of thermal expansion. The fluorocarbon resins are ideally suited for use as the sealing member from the standpoint of lubricity and friction but it is difficult to control the tendency of these resins to expand at a higher rate than the part being sealed under high temperature conditions. It is not possible to overcome the high expansion characteristics of the fluorocarbon resins by simply increasing the size and strength of the garter spring as this causes the spring to penetrate and eventually cut through the sealing member. Also this expedient unduly increases the friction between the sealing member and the part being sealed thereby generating heat at this point which aggravates the expansion problem and results in excessive wear of the sealing member. Another factor of significance is that the seal of this invention frequently is required to function over a relatively wide temperature range. For example, the seal when installed in an automobile must, by manufacturers' specification, function from —60° F. to +350° F. Ideally, it should not develop excessive friction at any temperature within this range and the sealing member is expected to have a life expectancy of at least one hundred thousand miles of operation of the automobile. It has been found that these requirements can be met in the case of a fluorocarbon resin sealing member only if the member is maintained essentially thin. By "essentially thin" it is meant that the seal should have a maximum thickness of about .020 inch. An optimum thickness for the sealing member is about .013 inch to about .015 inch.

The simple uncomplicated form of the sealing member makes it easy and inexpensive to manufacture, and the unique correlation between the sealing member and the support and between the sealing member and the shaft or other surface to be sealed thereby makes the seal easy to install. Also, the particular shape of the seal and the manner in which it is mounted in the environment makes it particularly efficient in use.

Under high pressure conditions the seal is installed with the intermediate portion thereof facing the high pressure side. Under these circumstances, environmental pressure is imposed on the outer sealing flange of the seal and thus augments the force exerted by the outer spring to effect a fluid-tight seal between the flange and its support. However, inasmuch as the inner sealing flange is shielded from environmental pressure, the inner spring alone determines the sealing pressure between this flange and the shaft or other surface engaged thereby. In this manner, the environmental pressure is utilized to assist in maintaining an efficient seal at the outer stationary part of the seal assembly but does not affect the action of the seal at the moving part of the assembly. Thus, the pressure between the sealing member and the moving part can be accurately controlled. If the pressure at this point is too great, excessive wear of the sealing member occurs, and if the pressure at this point is too little it is not possible to maintain an efficient seal. By reason of the instant construction exactly the right pressure can be maintained by the spring on the inner sealing flange, and this pressure is not affected by variations in pressure invariably occurring in the system.

Other objects and advantages of the invention will be apparent during the course of the following description.

In the drawing forming a part of this specification and wherein like numerals are employed to designate like parts throughout the same;

FIGURE 1 is a longitudinal sectional view showing a seal assembly embodying the invention in a stationary part and around a movable shaft, the sealing member being mounted on a support formed separately from the stationary part;

FIGURE 2 is a fragmentary transverse sectional view taken on the line 2—2 of FIGURE 1;

FIGURE 3 is a view similar to FIGURE 1 but showing a modified sealing member and support;

FIGURE 4 is a view similar to FIGURE 1 but showing the support for the sealing member formed integrally with the stationary part;

FIGURE 5 is a fragmentary sectional view showing a modified sealing member particularly adapted for use under high pressure conditions;

FIGURE 6 is a fragmentary sectional view showing a modified means for retaining a garter spring on the inner flange of the sealing member; and FIGURE 7 is a graph showing the friction characteristics of sealing members of varying thickness within the temperature range of —60° F.—+350° F.

As suggested, the seal of this invention is adapted for use under either static or dynamic conditions. However, for purpose of illustration only it is shown in a dynamic environment. In this connection, reference is first had to the form of the invention shown in FIGURE 1 wherein the numeral 10 designates a shaft mounted by any suitable or conventional means (not shown) for movement in a housing 12 or other stationary part. A seal is provided between the shaft 10 and the housing 12, and, in the form of the invention here shown, the seal assembly is formed separately from the housing so that it can be inserted or removed as a unit. To this end, the housing 12 is formed in the front radial face 14 with an annular groove or recess 16 which surrounds and is concentric to the shaft 10.

The seal assembly comprises an annular support 18 having a base portion 20 which fits snugly in the recess 16 and a medianly disposed forwardly extending flange 22. As clearly shown in the drawing, the flange 22 is inwardly offset from the periphery or outer circumference of the base 20 and accordingly is spaced from the annular wall 24 of the recess 16. Similarly, the flange 22 is outwardly offset from the inner edge of the base 20 and is spaced a substantial distance from the shaft 10. In this connection it will be observed that the internal diameter of the support 18 is larger than the diameter of the shaft 10 so that ample clearance is provided between the support and the shaft. The support 18 can be fastened to the housing 12 in any desired manner and is here shown press fitted into the recess 16.

Mounted on the support 18 is an annular sealing member 26 having an intermediate bight portion 28 and inner and outer sealing flange portions 30 and 32 which extend in the same direction from the bight portion. As suggested, the sealing member 26 is made from a fluorocarbon resin such as Teflon or Kel–F. The inner flange 30 fits relatively snugly around the shaft 10 and the outer flange 32 surrounds and seats inwardly against the flange portion 32 of the support 18. Garter springs 34 and 36 surround sealing flanges 30 and 32 respectively adjacent to the free edges thereof.

As indicated in the drawing, the sealing member 26 preferably is made oversize with respect to the shaft 10 so that the seal assembly can be easily slipped onto the shaft. Thereafter, constrictive pressure exerted on the inner sealing flange 30 by the spring 34 contracts the free edge portion of the flange into close-fitting pressed fluid-tight engagement with the shaft 10. A fluorocarbon resin sealing member of the above form and shape will conform readily under the action of the spring 34 to the size and shape of the shaft 10, and since the spring 34 is tensioned to maintain a constant uniform constrictive pressure entirely around the circumference of the flange 30 an efficient seal is established between the flange and the shaft. By reason of the fact that the sealing member 26 is essentially oversize with respect to the shaft 10, the area of contact between the sealing member and the shaft is confined to substantially the free edge portion of the flange 30. In this manner, wear of the sealing member is maintained at a minimum and drag or resistance offered by the seal to movement of the shaft 10 also is minimized. The outer garter spring 36 is tensioned to exert a constant uniform constrictive pressure around the entire circumference of the outer flange 32 so as to hold the latter in pressed sealing engagement with the support 18. Sufficient pressure is exerted by the spring 36 to effect an efficient seal between the sealing member 26 and the support 18.

As suggested, the special shape of the sealing member 26 has particular significance if the seal is used under high pressure conditions. Under these circumstances, the seal assembly is mounted in the housing 12 with the bight portion 28 of the sealing member 26 facing the high pressure side of the system and the flanges 30 and 32 extending away from the high pressure side. By arranging the seal in this manner, pressure in the system is imposed on the outer surface of the outer flange 32 but the inner flange 30 is shielded from the pressure by the bight portion 28. Accordingly, environmental pressure augments the action of the spring 36 to effect and maintain an efficient seal between the outer sealing flange 32 and the support 18, but the spring 34 alone determines the sealing pressure between the inner flange 30 and the shaft 10.

The mode of operation hereinabove disclosed is desirable inasmuch as the problem of maintaining an efficient seal between the sealing member 26 and the stationary part 18 without at the same time exerting excessive pressure on the moving part of the seal frequently is difficult of solution. Too great pressure between the sealing member 26 and the moving part 10 results in excessive wear of the sealing member, and insufficient pressure at this point results in an inefficient seal. When both the dynamic and the static portions of the sealing member 26 are exposed to fluid pressure in the system, these factors are very difficult to control for the reason that the pressure in the system invariably fluctuates considerably. In the present seal, the static sealing flange 32 is pressed against the support 22 with increasing force as the pressure in the system rises, and the increased force thus exerted by the environmental pressure increases the efficacy of the seal at this point. However, variations of pressure in the system do not affect the sealing force between the dynamic sealing flange 30. This force is governed solely by the spring 34 and the latter is preset or preadjusted to press the flange 30 against the shaft 10 with just sufficient force to hold maximum pressure developed within the system.

In addition to the above, it is desirable under all conditions of use but particularly under high pressure conditions to form the support 18 and the sealing member 26 so that the flange 22 supports and internally reinforces the bight portion 28. When the parts are correlated in this manner, the flange 22 effectively prevents pressure in the system from collapsing the sealing member 26 and reducing the efficacy of or perhaps even destroying the seal.

In order to assure an efficient seal between the static seal flange 32 and the support 18, the flange 32 is provided adjacent to the base 20 with spaced parallel annular ridges 38 and 40. The ridges 38 and 40 substantially underlie the spring 36 so that the the constrictive pressure exerted by the spring causes the ridges to bite into the flange 32. The interfitting relation thus established between the support 18 and the sealing member 26 at this point materially reduces any possibility of pressure loss between the sealing member and the support.

It is desirable to provide seats for the springs 34 and 36 adjacent to the free edges of the flanges 30 and 32. Otherwise, the springs 34 and 36 tend to slip off of the sealing flanges 30 and 32 under certain conditions of use, and if this occurs the seal is of course destroyed. To this end, the sealing flanges 30 and 32 are formed at the free edges thereof with radially outwardly extending annular ribs 42 and 44. The inner sides of the ribs 42 and 44 and the adjacent surfaces of the flanges 30 and 32 are formed to seat the springs 34 and 36. When the springs 34 and 36 are snapped onto the sealing flanges 30 and 32 the ribs 44 and 42 form abutments or stops which prevent the springs from slipping off of the flanges. Of course, the ribs 44 and 42 have a stiffening effect on the flanges 30 and 32 but this effect is minimized by providing a plurality of transverse slots 46 in the ribs as perhaps best shown in FIGURE 2. The slots 46 permit the ribs 42 and 44 to form the necessary seats and abutments for the springs 34 and 36 and at the same time provide for sufficient flexibility in the flanges to effect and maintain an efficient seal.

The form of the invention shown in FIGURE 3 is substantially the same as the one shown in FIGURE 1 except that the bight portion 28 of the sealing member 26 is relatively narrow and the inner sealing flange 30 is angled obliquely toward the shaft 10. Also, the flange 22 of the support 18 is modified to conform to the shape of the sealing member 26. The modified shape of the sealing member 26 reduces the amount of mtaerial used therein and thus correspondingly reduces the cost of the seal.

In FIGURE 4 the support 18 is made integral with the housing 12. In every other respect the seal assembly is identical to the form shown in FIGURE 1.

If the seal is adapted for use under particularly high pressure conditions it is desirable to form the inner sealing flange 30 with an inner annular flexible flap 48, as shown in FIGURE 5. The flap 48 preferably is attached to the flange 30 adjacent to the free edge thereof, and it extends toward the high pressure side of the seal. Under these circumstances, pressure in the system seeking to bypass the flange 30 exerts downward force on the flap 48 which presses the latter tighter against the shaft 10 and increases the sealing pressure at this point. This arrangement has the advantage that supplemental sealing pressure is applied to the flap 48 when pressure in the system becomes great. Thus, the seal becomes more efficient if pressure rises in the system. However, when relatively low pressures exist in the system, little pressure is exerted through the flap 48 and the spring 34 provides all or substantially all of the sealing pressure against the shaft 10. Thus, the arrangement maintains wear of the sealing member at a minimum but increases the sealing pressure automatically when conditions are such that increased sealing pressure is necessary to maintain an efficient seal.

An alternative means for holding the inner spring 34 on the sealing flange 30 is shown in FIGURE 6. In this form of the invention the inner peripheral surface of the support flange 22 is formed closer to the sealing flange 30, and it is formed adjacent to the free edge of the flange 30 with an annular groove 50 which receives and confines a portion of the spring 34. Manifestly, the groove 50 serves the same purpose as the annular rib 46 and when the groove is used the rib is eliminated.

Reference is now had to FIGURE 7 which graphically illustrates the necessity of maintaining the sealing member 26 essentially thin in order to provide a practical and commercially acceptable seal under conditions most commonly occurring in use and under a range of temperature conditions to which seals of this type frequently are subjected in use. FIGURE 7 is a graph in which temperature in degrees Fahrenheit as the abscissa is plotted against torque in inch pounds as the ordinate. The curves 52, 54, 56 and 58 illustrate the performance under the graph conditions of sealing members 26 having thicknesses of .032 inch, .023 inch, .019 inch and .013 inch respectively. It is significant to note that the two sealing members represented by curves 52 and 54 developed twenty inch ounces of torque at about 68° F. and 48° F., respectively, and that the friction between these sealing members and the parts engaged thereby increases abruptly and rapidly as at lower temperatures. These sealing members developed excessive friction and showed excessive wear at low temperatures and were completely incapable of functioning satisfactorily from a commercial point of view over a range of temperatures frequently required of seals of the type here under consideration and to which they are subjected when used in an automobile transmission, for example. Because of excessive friction and wear these sealing members had a relatively short life and were not acceptable for many, if not most, uses. The sealing members represented by curves 56 and 58 on the other hand, unexpectedly showed no abrupt change in friction within the temperature range of the graph and imposed as a practical matter by normal operating conditions. The sealing member represented by curve 56 developed a maximum torque of twenty inch-ounces at −60° F. and the sealing member represented by the curve 58 developed a torque resistance of about nine inch-ounces at −60° F. Both of these seals are commercially acceptable and function with relatively little friction over the entire temperature range of the chart. Both of the seals represented by curves 56 and 58 are capable of following and maintaining a constant sealing engagement with rapidly rotating shafts having considerable lateral movement or whip without developing excessive heat at the point of sealing engagement and without causing excessive wear of the sealing members. Both of these sealing members were held in proper sealing engagement with a rotating shaft under the above conditions using relatively light garter springs. Both of these sealing members evidenced extreme longevity, and accelerated wear tests indicate that both are capable of lasting for in excess of one hundred thousand miles under conditions of temperature and pressure encountered in an automobile transmission.

From the foregoing, it will be readily apparent that I have accomplished the objects of my invention. I have provided a seal that is simple and inexpensive to manufacture. The seal assembly can be adapted to a wide variety of uses and can be used under either high or low pressure conditions. Also, by reason of the essential thinness of the sealing element expansion thereof can be controlled by means of a relatively soft spring over an essentially wide range of temperature conditions. It can be easily and quickly installed. The sealing member can be made essentially thin in the interest of economy and flexibility in use and it is associated with its support in such a way that pressure in the system will not destroy the efficacy of the seal. Also, the sealing member is arranged in the assembly in such a way that under high pressure conditions pressure in the system augments the static portion of the seal without affecting the dynamic portion thereof.

What is claimed is:

1. A seal for sealing first and second relatively movable parts comprising an annulus of fluorocarbon resin material having one peripheral portion secured to said first part in sealed relation and the other peripheral portion sealingly riding on said second part, said other peripheral portion being unsupported so as to permit the same to be freely flexible and to follow the motion of said second part, and at least the part of the annulus at said other peripheral portion having a thickness not exceeding about .020 inch to maintain a low torque load on said second part throughout a wide temperature range.

2. A seal for sealing first and second relatively movable parts comprising an annulus of fluorocarbon resin material having one peripheral portion secured to said first part in sealed relation and the other peripheral portion sealingly riding on said second part, and a garter spring surrounding said other peripheral portion holding the same in sealing engagement with said second part entirely around the circumference thereof, said other peripheral portion being unsupported so as to permit the same to be freely flexible whereby to follow the motion of said second part, and at least the part of the annulus at said other peripheral portion having a thickness not exceeding about .020 inch to maintain a low torque load on said second part throughout a wide temperature range.

3. An annular sealing member of fluorocarbon resin material having an intermediate portion and sealing flanges extending generally axially from said intermediate portion, one of said sealing flanges being adapted to slidably seal against an annular surface of a rotatable member and having an annular radially outwardly extending rib at the outer side adjacent to the free edge thereof, said rib having a plurality of spaced transverse slots, said rib defining a spring seat at the side thereof inwardly of the free edge, at least said one sealing flange having a thickness not exceeding about .020 inch, and said slots making the rib portion of said one sealing flange essentially and sufficiently flexible so that a spring on said seat holds the inner surface of said one flange in pressed engagement with the annular surface of the rotatable member engaged thereby entirely around the circumference thereof.

4. A seal having a high pressure side and a low pressure side and an annular support extending in the direction of said high pressure side, an annular one-piece sealing member of fluorocarbon resin material having a thickness not exceeding about .020 inch, said member having an intermediate portion seating on said support and laterally spaced inner and outer sealing flanges extending in the same direction from said intermediate portion, said sealing flanges arranged concentrically to said support, said outer sealing flange surrounding said support and seat thereagainst, said inner sealing flange being spaced radially inwardly from said support, and annular constrictive spring members surrounding said inner and outer sealing flanges, the spring member on said outer sealing flange exerting a constrictive pressure against the latter to hold the same in pressed engagement with said support entirely around the circumference thereof and said spring being exposed to said high pressure side so that pressure at the high pressure side augments the action of said spring to hold the sealing flange pressed against said support, the spring on said inner sealing flange exerting a constrictive force on the latter tending to hold the same pressed against an annular surface to be sealed thereby, said last mentioned spring being exposed to said low pressure side so that the spring alone determines the pressure between said inner sealing flange and the surface engaged thereby, and whereby the seal between the inner sealing flange and said surface engaged thereby is relatively unaffected by variations in pressure at the high pressure side of the system.

5. A seal having a high pressure side and a low pressure side and an annular support extending in the direction of said high pressure side, an annular one-piece sealing member of fluorocarbon resin material having a thickness not exceeding about .020 inch, said member having an intermediate portion seated on said support and inner and outer sealing flanges extending generally axially in the same direction therefrom, said outer sealing flange surrounding and seating on said support and at least a portion of said inner sealing flange adjacent to the free edge thereof being spaced radially inwardly from said support, garter springs surrounding said inner and outer sealing flanges adjacent to the free edges thereof, the spring on said outer sealing flange holding the latter in pressed engagement with said support around the entire circumference thereof, and pressure at said high pressure side augmenting the action of said spring to effect a seal between said outer sealing flange and said support, the spring on said inner sealing flange being adapted to hold the latter in pressed engagement with an annular surface to be sealed thereby, and an essentially thin flexible annular flap on the inner surface of said inner sealing flange adjacent to the free edge thereof and extending in the direction of said high pressure side, the spring on said inner sealing flange being exposed to said low pressure side and being relatively unaffected by variations in pressure at said high pressure side, said flap being exposed to said high pressure side and adapted to be pressed against the surface engaged by said inner sealing flange by pressure from said high pressure side.

References Cited by the Examiner
UNITED STATES PATENTS

| | | | |
|---|---|---|---|
| 2,720,431 | 10/55 | Browne et al. | 308—83 |
| 2,750,212 | 6/56 | Skinner | 277—153 |

FOREIGN PATENTS

| | | |
|---|---|---|
| 562,922 | 7/44 | Great Britain. |

LEWIS J. LENNY, *Primary Examiner.*

EDWARD V. BENHAM, *Examiner.*